Oct. 5, 1965      F. A. HUSSEY      3,209,431
CUTTING TOOL
Filed Oct. 23, 1963

INVENTOR.
Forrest A. Hussey
BY
Roberts, Cushman & Grover
ATT'YS

3,209,431
CUTTING TOOL
Forrest A. Hussey, Wilton, N.H., assignor to The O.K. Tool Company, Inc., Milford, N.H., a corporation of New Hampshire
Filed Oct. 23, 1963, Ser. No. 318,295
2 Claims. (Cl. 29—96)

This invention relates to cutting tools for boring, milling, reaming, etc., of the type comprising a carrier movable along a predetermined path, usually a circular path as in the case of a rotary head, the carrier having a plurality of recesses to receive blades with their cutting edges projecting from the recesses in a direction transverse of said path, opposed faces of each blade and recess having serrations extending in said direction and the blade being tapered toward the edge opposite said cutting edge so as to wedge in the recess when driven into the recess in said direction. More particularly the invention relates to a tool in which the aforesaid serrations are on the back of the blade and the rear face of the recess, that is the face behind the blade. In the case of a rotary tool the recess may open through the end face or the peripheral face of the carrier or through both faces. In the latter case the serrations may extend either axially or radially.

By making the blades wedge-shaped the necessity of additional locking wedges is eliminated, the blades locking automatically when driven into the recess. However in tools of this kind there is the problem of accurately adjusting the extent to which the cutting edges project from the recesses.

Objects of this invention are to provide means for adjusting blades of the aforesaid tapered type which are simple and economical to produce, which can be adjusted quickly and easily, which are durable and reliable in use and which may also serve to cushion shocks on the blades.

According to the present invention corrugated shims are fitted between the aforesaid serrations in the blade and recess, each shim having uniform thickness so that it can be made of sheet material and being interchangeable with shims of different thicknesses to vary the extent to which the blade projects from the recess. Preferably the shims are placed behind the blades so as not to interfere with the action of the chip-breaking recesses in front of the blades, and when so placed they are preferably made of compressible resilient material, such as brass, sintered bronze or plastic, to absorb shocks on the blades.

Figure 1:
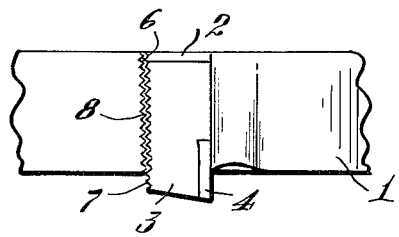
Figure 2:
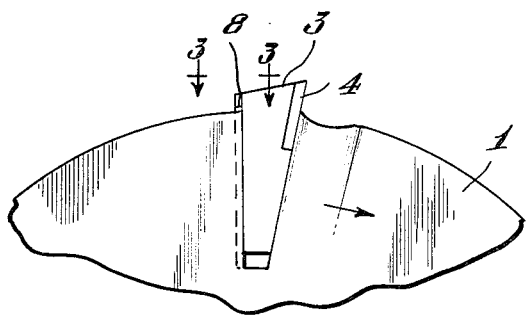
Figure 3:
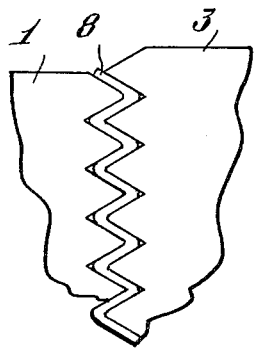
Figure 4:
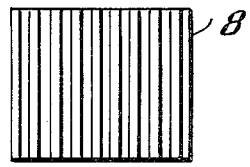
Figure 5:
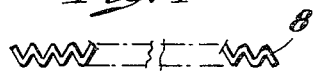

For the purpose of illustration a typical embodiment of the invention is shown in the accompanying drawing in which FIG. 1 is a peripheral view;
FIG. 2 is an end view;
FIG. 3 is a view from the line 3—3 of FIG. 2;
FIG. 4 is a face view of a shim; and
FIG. 5 is an end view of the shim.

The particular embodiment of the invention chosen for the purpose of illustration comprises a rotary head 1 having recesses 2 in its periphery. Mounted in each recess is a blade 3 having a cutting edge 4 projecting from the recess both axially and radially. The rear face of the recess has serrations 6 and the rear face of the blade has complemental serrations 7. As shown in FIG. 2 the blade is tapered so that, when driven into the recess, it is wedged tightly in place.

According to this invention a thin corrugated shim 8 is fitted between the serrations 6 and 7 so that, when driven into the recess, the blade projects farther from the recess than it would without the shim. By choosing a shim of proper thickness the blade may be caused to project from the recess any desired distance. The blades of a set may differ in thickness any desired amount, say $1/1000$ of an inch. The shims have uniform thickness so that they can be made economically by corrugating sheets of different thicknesses. By making the shims of compressible resilient material they also serve to absorb shock on the blades.

It should be understood that the present disclosure is for the purpose of illustration only and that this invention includes all modifications and equivalents which fall within the scope of the appended claims.

I claim:

1. A cutting tool comprising a carrier movable along a predetermined path and having a recess therein, a blade mounted in the recess with a cutting edge projecting from the recess in a direction transverse of said path, opposed faces of the blade and recess having complemental serrations extending in said direction and the blade being tapered toward the edge opposite said cutting edge so as to wedge in the recess, and a resilient shock absorbent shim fitting between said serrations, the shim having serrations on its opposite sides fitting the serrations of said blade and recess respectively.

2. A cutting tool comprising a carrier movable along a predetermined path and having a recess therein, a blade mounted in the recess with a cutting edge projecting from the recess in a direction transverse of said path, the rear faces of the blade and recess having complemental serrations extending in said direction and the blade being tapered toward the edge opposite said cutting edge so as to wedge in the recess, and a resilient shock absorbent shim fitting between said serrations.

References Cited by the Examiner
UNITED STATES PATENTS 1,180,377  4/16  Conklin _____ 29—105
1,354,578  10/20 Ritchie _____ 29—105

WILLIAM W. DYER, JR., *Primary Examiner*